United States Patent Office.

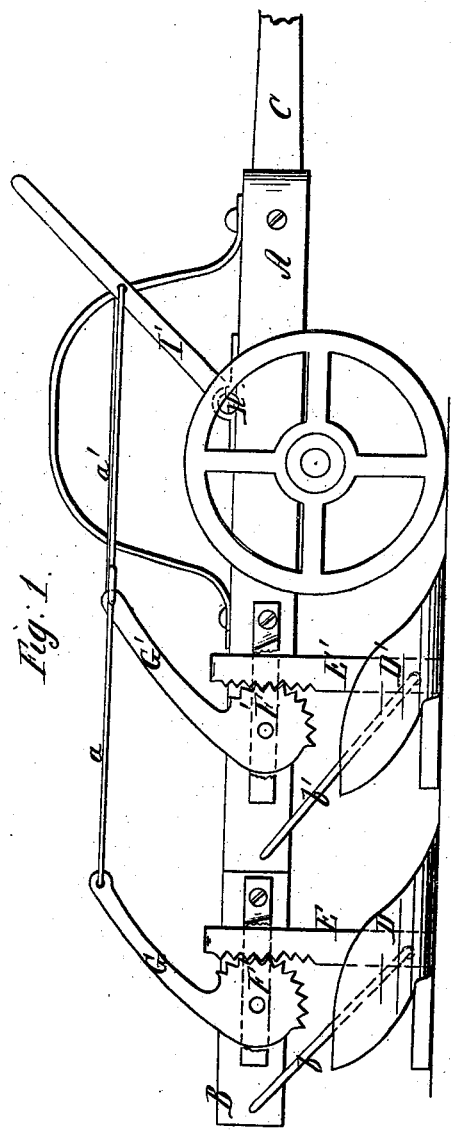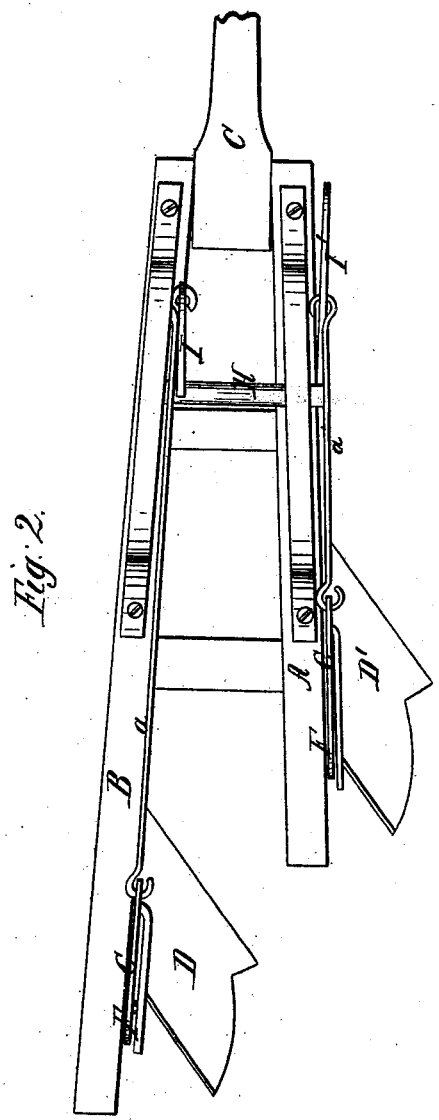

PETER H. FLANSBURGH, OF HAYWARDS, CALIFORNIA.

Letters Patent No. 102,801, dated May 10, 1870.

IMPROVEMENT IN GANG-PLOW.

The Schedule referred to in these Letters Patent and making part of the same.

*To all whom it may concern:*

Be it known that I, PETER H. FLANSBURGH, of Haywards, Alameda county, State of California, have invented certain new and useful Improvements in Gang-Plows; and I do hereby declare the following description and accompanying drawings are sufficient to enable any person skilled in the art or science to which it most nearly appertains to make and use my said invention or improvements without further invention or experiment.

The object of my invention is to provide an improvement in gang-plows, whereby the plows may be easily and readily raised or depressed, as may be desired, without the necessity of raising and lowering the carriage.

This is accomplished by constructing the frame, composed of two beams, one longer than the other, placed at a sufficient distance apart and mounted on wheels. To the rear end, by standards, are attached the plows, one to each beam. The upper ends of these standards are notched so as to form racks, while their lower ends are fastened, one to each land-side, and pass through supports on the sides of the beams. A toothed segment, operated by levers, works each of these racks or standards. Near the wheels is a shaft having two arms or levers, the outside one being the longest, and within convenient reach of the driver, and which may be held in a rack in any position. A rod connects the lever which operates the toothed segment to the levers in front, so that, when the levers are thrown back, the plows are raised out of the ground, and, when thrown forward, they enter it to any desired depth.

A rod extends from back of the attachment of the segment, and is fastened loosely to the bottom of the standard near the land-side, which throws the point of the plow up. When the levers are thrown back the plows will easily clear themselves from the ground. A hinge may be employed in place of the racks and pinions, to raise and lower the plows, and the same end attained.

To more fully illustrate and explain my invention, reference is had to the accompanying drawings forming a part of this specification, of which—

Figure 1 is a side elevation.

Figure 2 is a top view.

Similar letters of reference, in each of the figures, indicate like parts.

A and B are two beams placed at a sufficient distance apart, having the pole or tongue C placed between their front ends, the whole being mounted on wheels. The beam B is longer than the beam A.

Plows D and D' are attached one to each beam near their rear ends, by means of standards E and E', the lower ends of which are attached to the land-side of each plow, while one side of the upper end is notched so as to form a rack.

Segmental pinions F and F', having levers G and G', are attached so as to operate in the rack and raise and lower the plows.

Near the wheels, and within convenient reach of the driver, so as to be operated by hand, are two levers, I' I, fastened to a shaft, H, working in boxes on the beams.

Bars $a$ $a'$ connect the top of the levers, which operate the toothed segments with the levers I I', so that, by operating the levers in front, the plows may be either raised out of the ground or lowered to any desired depth.

Small rods $b$ $b'$ are inserted in the beam, back of the toothed segment, and the other ends are fastened so as to work loosely in the standard near the land-sides, so that, when the levers are thrown forward, the point of the plow will be turned up, and thus easily and readily emerge from the ground.

Having thus described my invention,

What I claim, and desire to secure by Letters Patent, is—

1. The plows D D' in a gang, moved up and down by the standards E E', forming racks, as shown, the segments F F', the levers G G', or an equivalent device, operating substantially as and for the purpose herein described.

2. The braces $b$ $b'$, attached to the plows at one end, and operating to throw the plows out of the ground in raising, substantially as herein described, in combination with the lifting device above claimed.

In witness whereof I have hereunto set my hand and seal.

P. H. FLANSBURGH. [L. S.]

Witnesses:
C. W. M. SMITH,
GEO. H. STRONG.